(12) United States Patent
Sushko et al.

(10) Patent No.: US 11,919,615 B1
(45) Date of Patent: Mar. 5, 2024

(54) BALLOON VENTING SYSTEM THAT VENTS GAS WITH DIMINISHED BALLOON ELASTICITY

(71) Applicant: WINDBORNE SYSTEMS INC., Palo Alto, CA (US)

(72) Inventors: Andrey Sushko, Medford, MA (US); John Dean, Palo Alto, CA (US); Joan Creus Costa, Mountain View, CA (US); Paige Brown, Palo Alto, CA (US)

(73) Assignee: WINDBORNE SYSTEMS INC., Palo Alto, CA (US)

( * ) Notice: Subject to any disclaimer, the term of this patent is extended or adjusted under 35 U.S.C. 154(b) by 0 days.

(21) Appl. No.: 17/401,795

(22) Filed: Aug. 13, 2021

Related U.S. Application Data

(62) Division of application No. 16/792,153, filed on Feb. 14, 2020.

(51) Int. Cl.
  *B64B 1/40* (2006.01)
  *B64B 1/64* (2006.01)
  *G01W 1/08* (2006.01)

(52) U.S. Cl.
  CPC .............. *B64B 1/40* (2013.01); *B64B 1/64* (2013.01); *G01W 1/08* (2013.01)

(58) Field of Classification Search
  CPC .... B64B 1/40; B64B 1/42; B64B 1/44; B64B 1/58; B64B 1/62; B64B 1/64; B64B 1/02;
  (Continued)

(56) References Cited

U.S. PATENT DOCUMENTS 3,686,721 A * 8/1972 Nelson ................ B64B 1/60
                                                    244/31
4,112,753 A   9/1978 Call
(Continued)

FOREIGN PATENT DOCUMENTS

CN     102966772 A  *  3/2013  ............. F16K 17/02
CN     206476089 U  *  9/2017

OTHER PUBLICATIONS

Businger, Steven et al. "Balloons as a Lagrangian measurement platform for atmospheric research." Journal of Geophysical Research 101 (1996): 4363-4376. (Year: 1996).
(Continued)

*Primary Examiner* — Daniel R Miller
*Assistant Examiner* — Eric Sebastian Von Wald
(74) *Attorney, Agent, or Firm* — Compass IP Law PC

(57) ABSTRACT

An apparatus is described. The apparatus includes a balloon venting system. The balloon venting system includes a clamp. The clamp is to clamp to the balloon so as to bear a mechanical load away from an opening in the balloon. The balloon venting system includes a fluidic channel that is coupled to the opening in the balloon. The opening in the balloon is not located at the bottom of the balloon. The balloon venting system includes an electro-mechanical device that is mechanically coupled to a valve. The electro-mechanical device is to drive the valve to open the channel so that gas within the balloon escapes the balloon when the valve is open and to close the channel so that gas remains within the balloon when the valve is closed.

13 Claims, 16 Drawing Sheets

(58) Field of Classification Search
CPC ............... B64B 1/00; B64C 2201/022; B29L 2022/022; G01W 1/08; G01N 1/2273; G01N 2001/2279; G01N 2203/0494; G01F 3/222; G01F 3/224; G01F 11/30; G01F 15/005; G05B 2219/45006; G05B 2219/49132; H01Q 1/1292; H01Q 1/28; H01H 2213/00; H01H 2227/02; H01H 9/047; H01M 50/308; H05K 5/0213; H05K 5/0217; H05K 2203/1178; F16C 33/726; F01C 2021/1662; F01C 20/12; F01C 20/14; F01C 20/16; F01C 20/10; F05D 2260/605; F16H 2007/0817; F16H 61/4174; F16K 24/00; F16K 11/025; F16K 11/022; F04B 53/121; F16B 2/02; F16B 5/06; Y10S 277/91; Y10S 254/15; Y10T 24/2189

See application file for complete search history.

(56) References Cited

U.S. PATENT DOCUMENTS

| | | | |
|---|---|---|---|
| 4,280,674 A * | 7/1981 | Crosby, Jr. ............... | B64B 1/62 244/31 |
| 6,394,388 B2 * | 5/2002 | Casteras ................ | B64B 1/58 244/31 |
| 6,421,010 B1 | 7/2002 | Chadwick et al. | |
| 9,114,866 B1 | 8/2015 | Roach | |
| 9,340,272 B1 | 5/2016 | DeVaul et al. | |
| 9,422,048 B1 * | 8/2016 | Roach ................... | D03D 3/005 |
| 9,540,091 B1 | 1/2017 | MacCallum et al. | |
| 9,908,607 B1 * | 3/2018 | Fourie ..................... | B64B 1/58 |
| 10,336,432 B1 | 7/2019 | Farley et al. | |
| 2009/0078818 A1 | 3/2009 | Zulkowski et al. | |
| 2016/0288894 A1 * | 10/2016 | Sehnert ................... | B64B 1/30 |
| 2017/0083019 A1 | 3/2017 | Knoblach et al. | |
| 2017/0129579 A1 | 5/2017 | Jong | |
| 2018/0118321 A1 * | 5/2018 | Brookes .................. | B64B 1/40 |
| 2018/0284811 A1 | 10/2018 | Alliss et al. | |
| 2019/0127037 A1 * | 5/2019 | Brookes .................. | B64B 1/58 |
| 2021/0323650 A1 | 10/2021 | MacCallum | |

OTHER PUBLICATIONS

Businger, et al., "Scientific Insights from Four Generations of Lagrangian Smart Balloons in Atmospheric Research", American Meteorological Society, Nov. 2006, 16 pages.

Global Aeorspace Corporation, "Global Constellation of Stratospheric Scientific Platforms" NIAC-NASA Institute for Advanced Concepts, Global Aerospace Corporation, Phase 1 Final Report, Dec. 31, 1999,120 pages.

Radiosondes, "Concept of Driftsondes" Elsevier Science Ltd. 2003, 14 pages, http://curry.eas.gatech.edu/Courses/6140/ency/Chapter1/Ency_Atmos/Radiosondes.pdf.

Final Office Action for U.S. Appl. No. 16/792, 153, dated Jun. 20, 2022, 29 pages.

Second Office Action for U.S. Appl. No. 16/792, 153, dated Jan. 3, 2023, 27 pages.

* cited by examiner (top-down/outside view)

(bottom-up/inside view)

(X-section/side view)

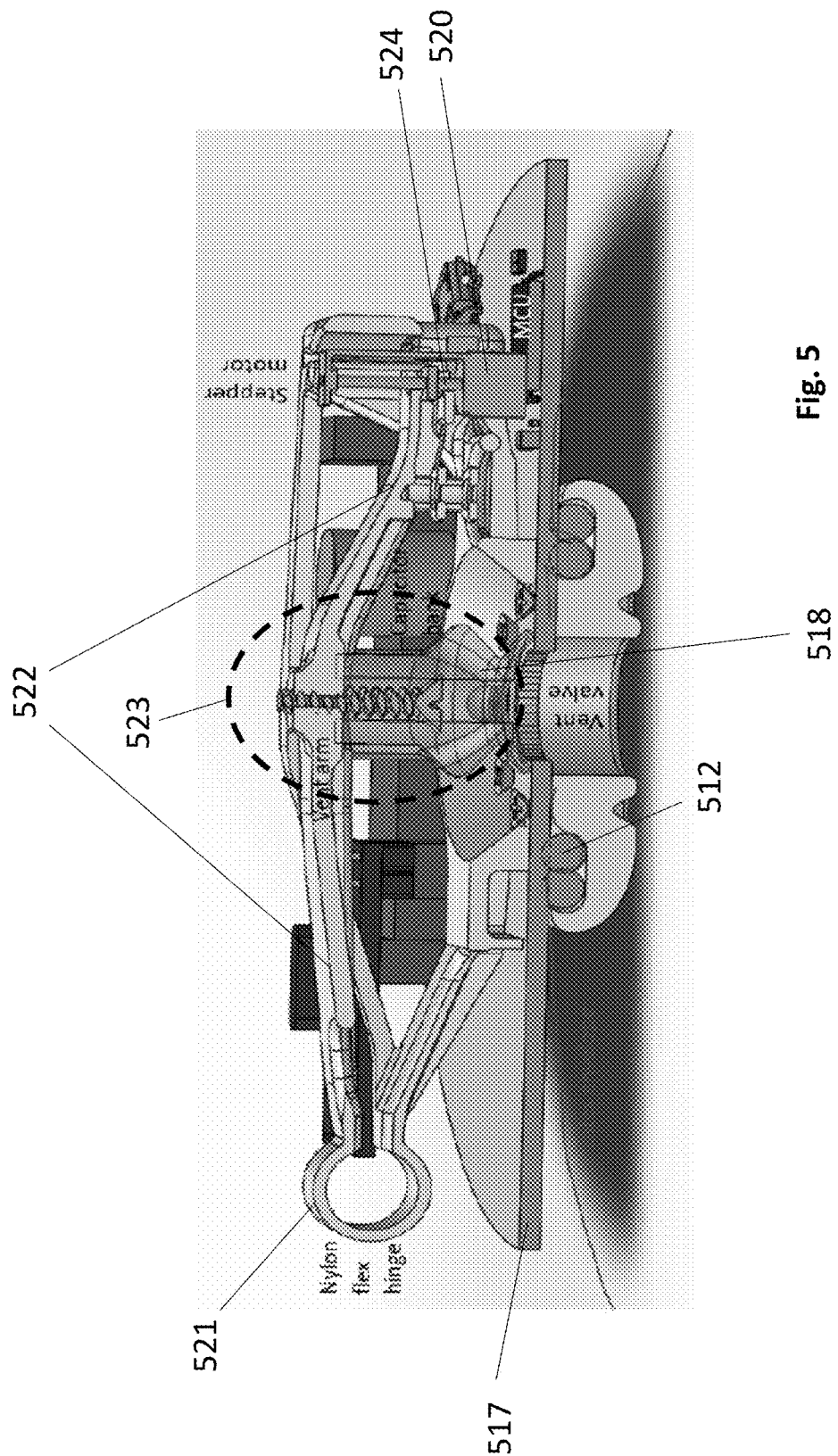

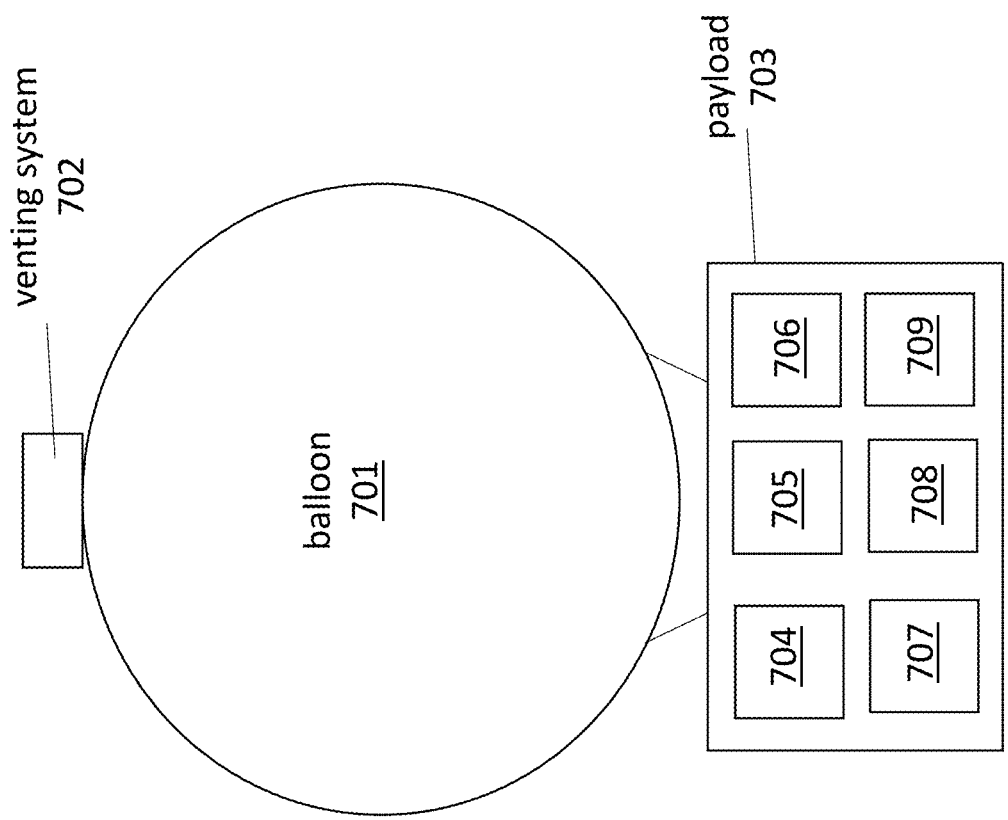

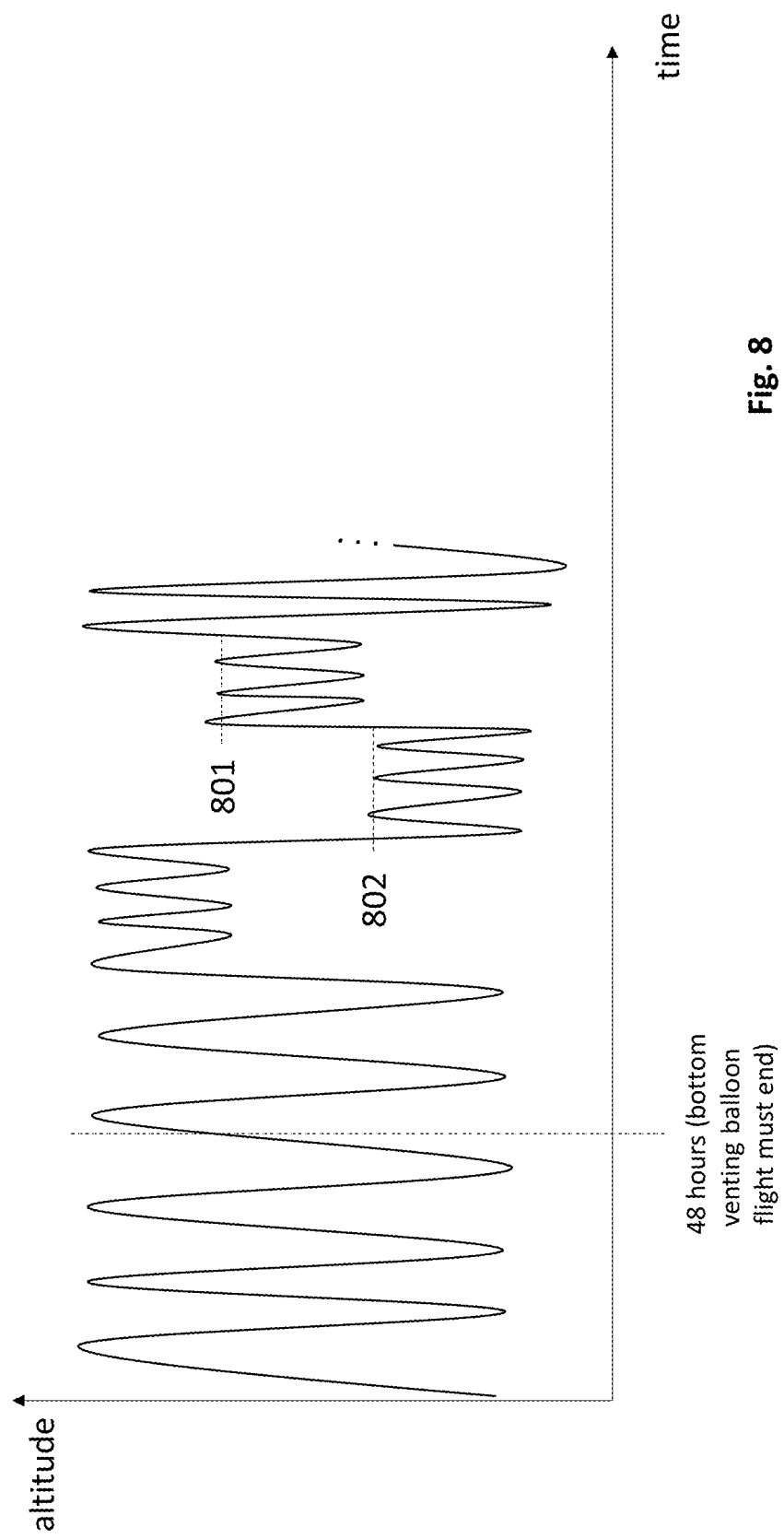

(drawing not to scale)

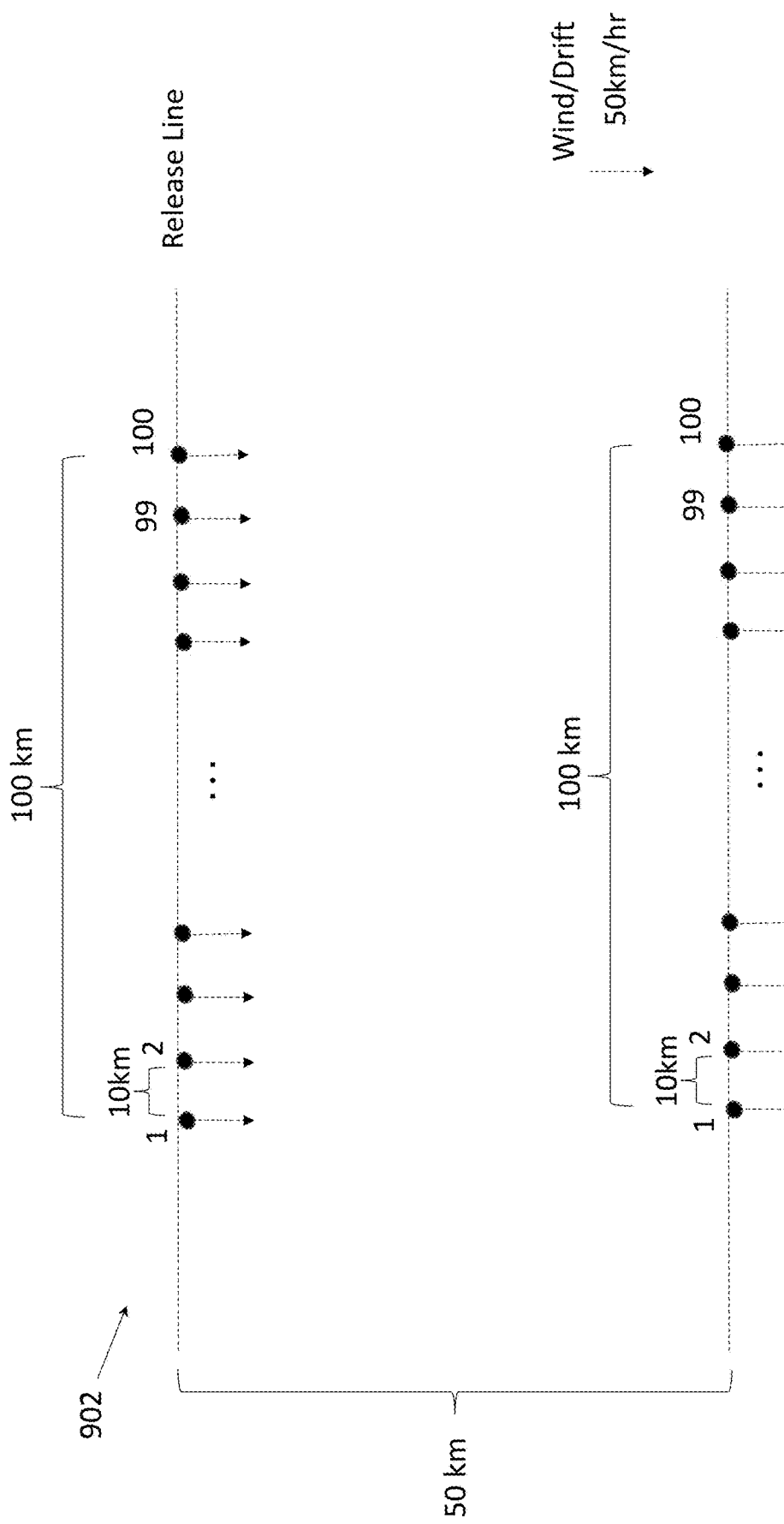

BALLOON VENTING SYSTEM THAT VENTS GAS WITH DIMINISHED BALLOON ELASTICITY

RELATED CASES

This application is a Divisional of and claims the benefit of U.S. patent application Ser. No. 16/792,153, entitled, "BALLOON VENTING SYSTEM THAT VENTS GAS WITH DIMINISHED BALLOON ELASTICITY", filed Feb. 14, 2020 which is incorporated by reference in its entirety.

FIELD OF THE INVENTION

The field of invention pertains generally to lighter-than-air flight, and, more specifically, to a balloon venting system that vents gas with diminished balloon elasticity.

BACKGROUND

Balloon technology has received renewed focus with the increasing need for geographic and/or atmospheric data, the comparably lower cost of lighter-than-air-flight (as compared to other forms of flight), the availability of low cost balloon materials and the availability of inexpensive, high performance communication technologies and/or sensing technologies (e.g., imaging, temperature, pressure, etc.).

FIGURES

A better understanding of the present invention can be obtained from the following detailed description in conjunction with the following drawings, in which:

FIG. 5 shows a more detailed embodiment of a venting system;

FIG. 7 shows a balloon system that adopts the venting approach of FIGS. 1a and 1b;

FIG. 8 shows a sounding/flight profile of a balloon system that adopts the venting approach of FIGS. 1a and 1b;

FIGS. 9a through 9c depict balloon measurement gathering over a surface area.

DETAILED DESCRIPTION

A particularly cost effective ballooning approach involves elastic balloons such as balloons composed of one or more polymers (e.g., rubber, latex, silicone, chloroprene, polyurethane, vinyl, etc.). Such balloons are easily/cheaply manufactured yet remain sufficiently non-porous to contain a balloon's lifting gas (e.g., helium) over a wide range of temperatures and atmospheric pressures. In particular, low cost elastic balloons allows for mass manufacturing of such balloons, which, e.g., allows for the concurrent release of large numbers of such balloons in a common/same timeframe and/or geographic region so that large amounts of information can be collected over the common/same timeframe and/or geographic region.

A challenge with an elastic balloon, however, is that the elasticity of the balloon's material degrades over 24-48 hours of flight (e.g., due to temperature cycling, ultra-violet (UV) and/or ozone induced degradation mechanism(s)). Elasticity is important in the case of a traditional elastic balloon that vents gas from an opening at the bottom of the balloon (venting gas from a balloon will cause the balloon to descend, or, increase its pre-existing rate of descent). Here, an elastic balloon, when expanded with lifting gas, naturally desires to contract inward to its normal, non-expanded shape. In the traditional approach where the lifting gas is vented from an opening at the bottom of the balloon, the contraction acts to force the venting gas from the opening. That is, the balloon's inward compression "squeezes" the lifting gas out of the bottom of the balloon.

If balloon elasticity degrades, however, the balloon's inward, contractive force likewise dissipates. As such, the venting of gas from the bottom of the balloon becomes more and more difficult to effect.

Figure 1B:
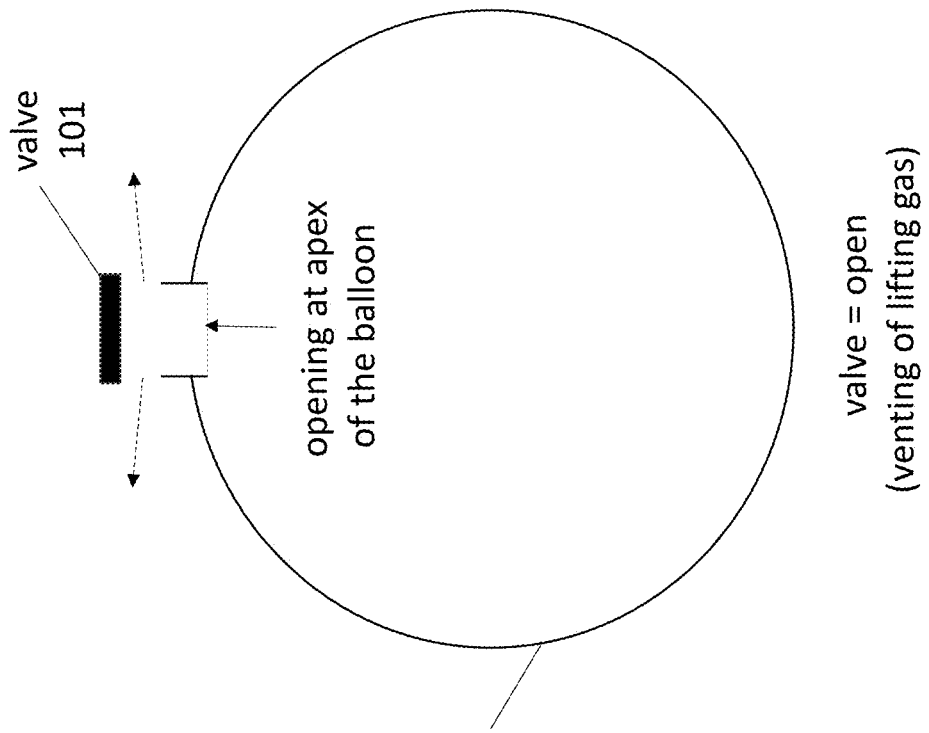
FIGS. 1a and 1b shows a balloon venting approach.
Figure 1A:
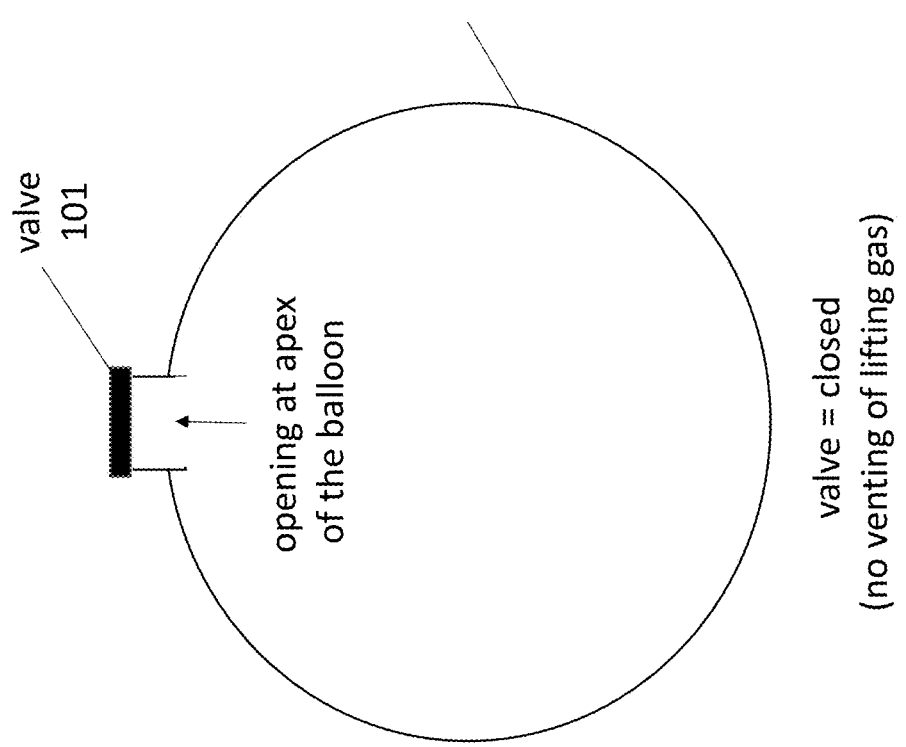

A solution, as observed in FIGS. 1a and 1b, is to release the lifting gas from an opening (e.g., at the top or "apex") of the balloon. If an opening exists at the apex of the balloon, the balloon will be able to vent lifting gas if balloon elasticity has dramatically degraded or does not even exist. That is, the lighter than air lifting gas simply rises out of the balloon from the opening at the balloon's apex. Thus, even if the balloon's elasticity degrades, by reliably controlling the opening at the balloon apex, controlled amounts of lifting gas can be precisely vented from the balloon allowing for, e.g., tight altitude control over extended periods of flight (e.g., beyond 48 hours).

As observed in FIGS. 1a and 1b, an airtight seal is formed when a valve 101 is "closed" in the apex vent system (FIG. 1a), whereas, the opening of the valve 101 effectively creates an opening at the balloon apex which allows the balloon's lifting gas to escape/vent (FIG. 1b).

A challenge however is the integration of a mechanical venting system at the balloon apex. Without an adequately precautioned design, the venting system can easily cause tearing or other destruction of balloon material at the balloon apex. Here, the relative thinness of the balloon material and/or the repeated expansive/contractive gas pressures within the balloon contribute to the propensity of the opening in the balloon to widen.

Figure 2A:
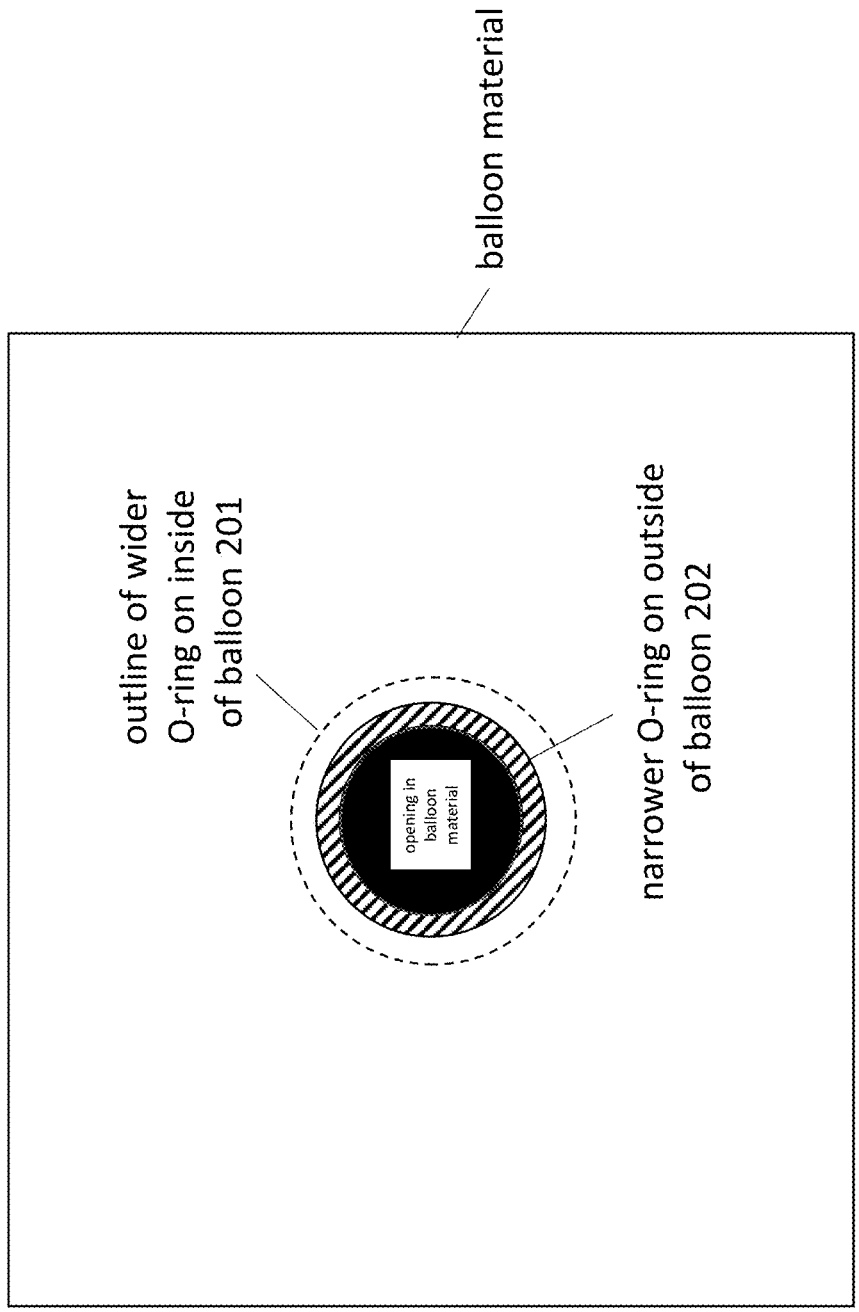
FIGS. 2a, 2b and 2c show an embodiment of a clamp that can be used to achieve the venting approach of FIGS. 1a and 1b.
Figure 2B:
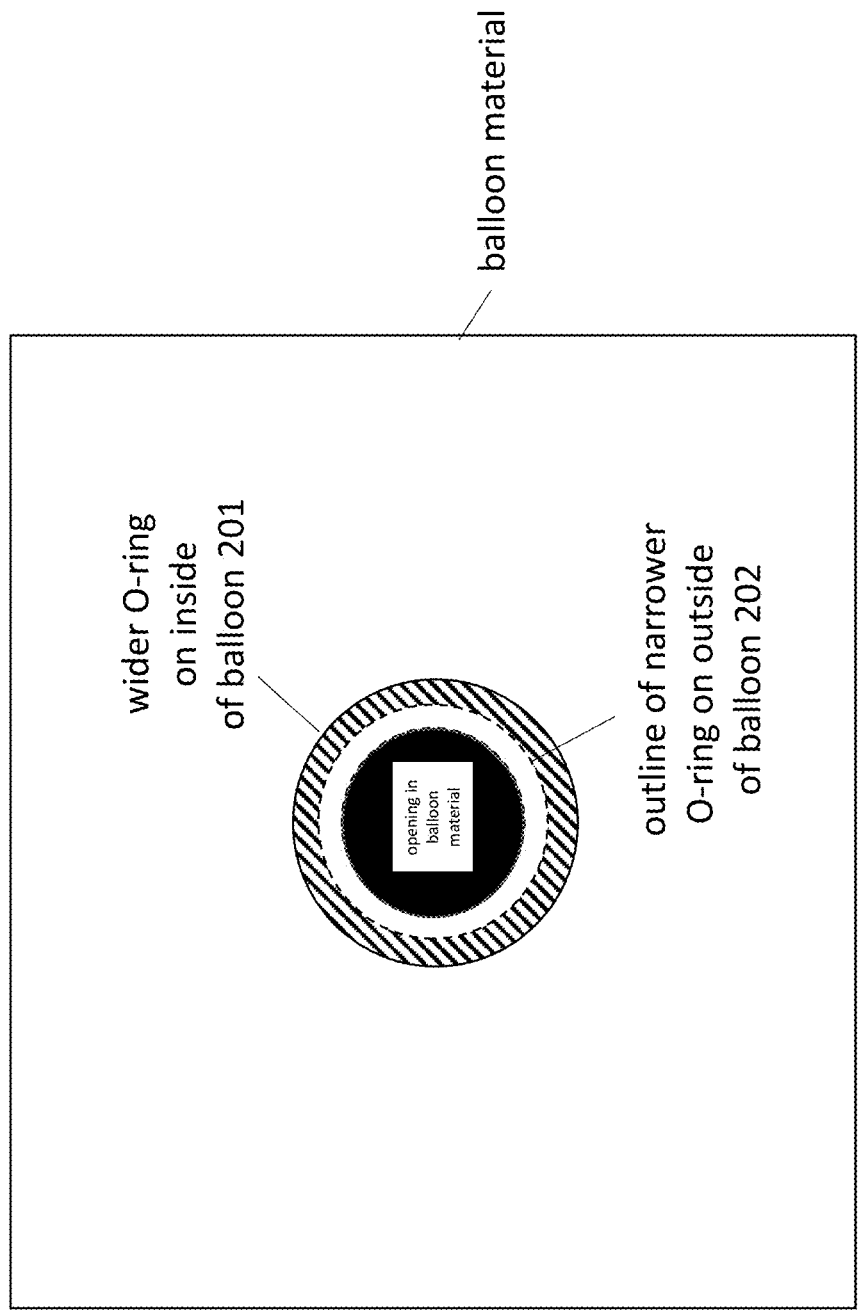
Figure 2C:
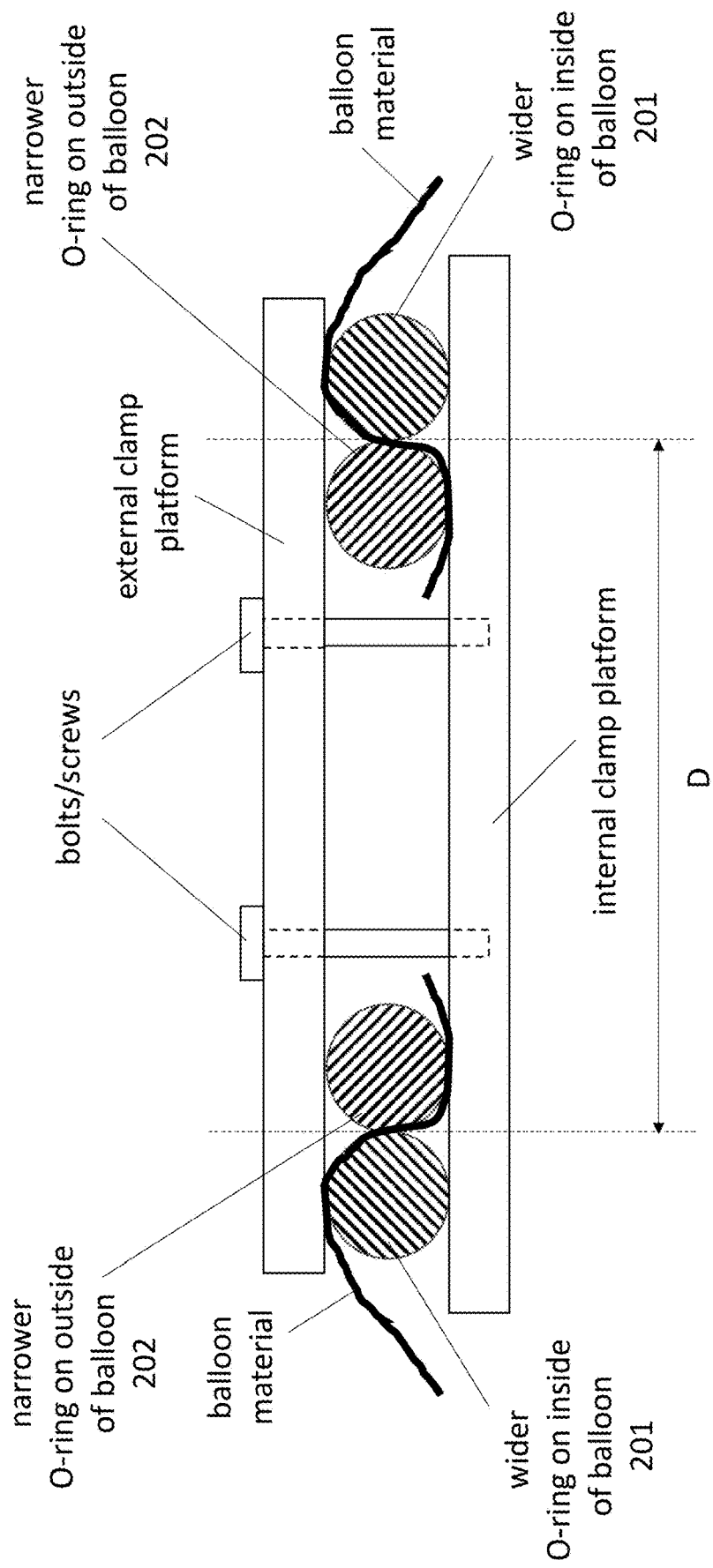

FIGS. 2a through 2c shows different views of a clamp to be implemented at the valve interface between the balloon opening and the apex venting system. As can be seen in FIGS. 2a through 2c, wider/internal 201 and narrower/external circular 202 O-rings are compressed together to form a clamp that causes the balloon to bear the load of the venting apparatus and the balloon's own internal compressive/expansive forces along a wider diameter D away from the balloon opening.

By bearing the load of the venting apparatus and the internal compressive/expansive forces away from the balloon opening, tearing or shearing or other failure at the balloon opening is avoided. In essence, the balloon material at the actual opening experiences little/no load or force from either the venting apparatus or the balloon's internal forces which substantially eliminates any propensity of the balloon opening to further enlarge.

FIGS. 3a through 3d depict a process for installing the above described clamping apparatus around the balloon opening, and then, mounting the venting apparatus to the clamping apparatus. As observed in FIG. 3a, first, an inner, wider clamp component (hereinafter simply "clamp") 310 with corresponding O-ring 301 is inserted into the balloon opening. The O-ring 301 of the inner clamp 310 is mounted to a base or substrate, hereinafter referred to as a platform 311. In the particular embodiment of FIGS. 3a through 3d, both the balloon opening and inner clamp O-ring 301 are circular with the radius of the O ring 301 being larger than the radius of the opening.

It is pertinent to point out that a circular O-ring best protects against the tearing of a circular balloon opening, and, a circular balloon opening best protects against the tearing of an opening in a spherical balloon. That is, the symmetry between the shape of the balloon, the shape of the opening and shape of the clamp all help minimize tearing forces at the balloon opening. Circular clamp structures and/or openings can also be successfully used for, e.g., oval shaped balloons. Likewise, oval shaped clamps and balloon opening can be used with oval or even spherical shaped balloons.

Other embodiments may have balloon shapes other than spherical or oval (e.g., square, rectangular, triangular, etc.) and therefore may have correspondingly similar/symmetric shaped balloon openings (e.g., square or rectangular for a square or rectangular balloon, triangular for a triangular balloon, etc.) and clamp structures (e.g., square or rectangular for a square or rectangular opening, triangular for a triangular opening, etc.). For ease of discussion the remainder of the discussion will assume a spherical balloon and circular balloon opening and clamp structure.

With the balloon being composed of elastic material, the opening in the balloon is easily stretched wider to allow for the insertion of the inner clamp 310 inside the balloon. Once the inner clamp 310 is inserted inside the balloon and the balloon opening has relaxed to its normal, smaller sized opening, the radius of the inner clamp's O-ring 301 is centered about the circumference of the balloon opening.

Figure 3A:
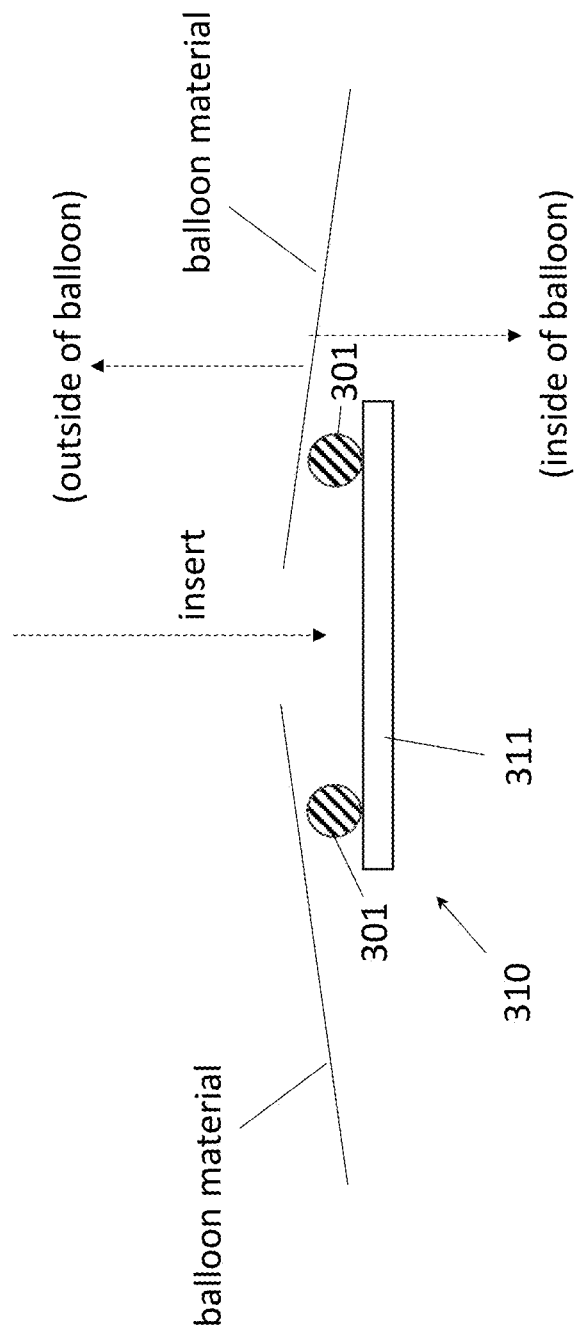
FIGS. 3a through 3d show a method for manufacturing a venting system.
Figure 3B:
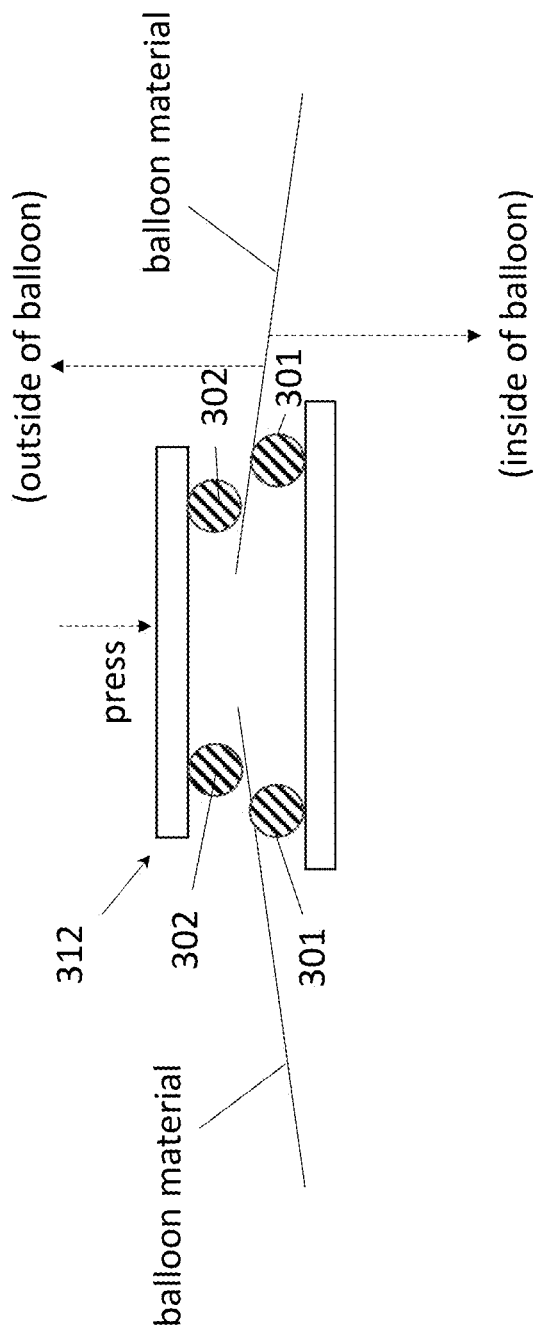

Then, as observed in FIGS. 3b and 3c, the external clamp component (hereinafter, simply "clamp") 312 is placed on the external balloon surface and its narrower O-ring 302 is fitted into the form of the O-ring 301 of the internal, wider clamp. Here, the radius of the narrower, external O-ring 302 is larger than the radius of the balloon opening but smaller than the radius of the wider, internal O-ring 301 of the internal clamp so that the external O-ring 302 tightly "fits into" the form of the internal O-ring 301 thereby forming a clamp that clamps the balloon material being the two O-rings 301, 302. In alternate embodiments the wider ring is external to the balloon and the narrower ring is internal to the balloon. For ease of discussion the remainder of the discussion assumes the narrower ring is external to the balloon and the wider ring is internal to the balloon.

The sandwiching of the balloon material between the O-rings along an outer radius D away from the radius of the balloon opening provides for the aforementioned shielding of the balloon opening from the loads/forces associated with the venting apparatus and/or the balloon's internal compressive/expansive forces.

Figure 3C:
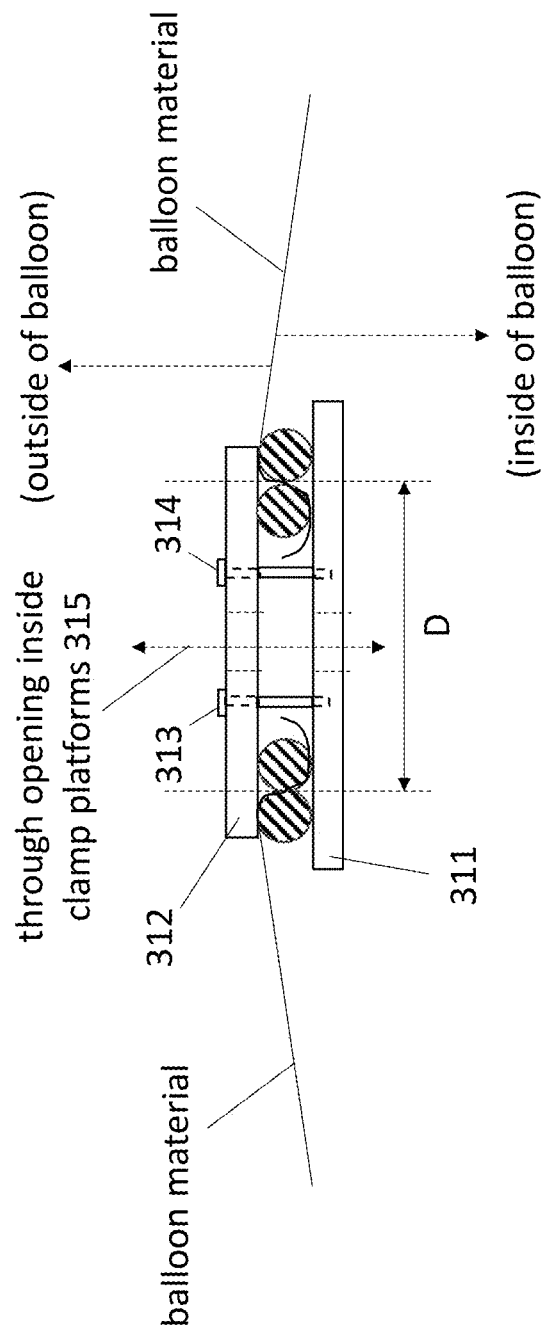

As can be seen in FIGS. 2c and 3c, in the particular embodiment being discussed, both of the O-rings 301, 302 have a circular cross section. The circular cross section allows a leading edge region of the balloon material (the smallest radius of balloon material that (first) touches the narrower, external O-ring 302 to "wrap" around an arc of the circular cross section of the external O-ring 302. Moving radially away from the opening along the balloon material between the O-rings, the balloon material transitions to a trailing edge region that wraps around an arc of the circular cross section of the wider, internal clamp 301.

The wrapping action of the balloon material around both O-rings 301, 302 as described above combined with the O-rings being tightly pressed against one another (one fits tightly into the other) secures a ring (or anulus) of balloon material against the O-rings 301, 302 which, in turn, as described above, effectively transfers all loads/forces experienced by the balloon in the vicinity of its apex to this ring/anulus of balloon material rather than along the balloon's opening. As can be seen in FIGS. 2c and 3c, the balloon material at the actual opening observes little/no force and essentially "drapes" or "lufts" inside the leading edge of the narrower, external O-ring 302.

In an embodiment, both O-rings are made of dense, yet elastic/compressible material that can keeps its elasticity/compressibility at low temperatures (e.g., silicone, buna-N, polyurethane, fluorosilicone) so that the narrower, external O-ring 302 will tightly fit inside the shape of the wider, internal O-ring 301 with the balloon material between them. For instance, if the radius of the wider, internal O-ring 301 is R1 and the radius of the cross section of the wider, internal O-ring is r1, the inner edge of the wider, internal ring will be a distance R1-r1 from the center of the balloon opening. Likewise, if the radius of the narrower, external O-ring 302 is R2 and the radius of the cross section of the narrower, external O-ring is r2, the outer edge of the narrower, external ring will be R2+r2 from the center of the balloon opening. If R1−r1=R2=r2 the outer edge of the narrower O-ring will just touch the inner edge of the wider O-ring. Although this is suitable for various embodiments, in preferred embodiments R1-r1 is slightly less than R2-r2 which forces one or both O-rings to deformably compress which further strengthens their clamping ability to each other and the balloon material. The rings of other embodiments can be shaped other than in a circle (e.g., spherical, square, rectangular, etc.).

With the narrower, external O-ring 302 being fitted into the form of the wider, internal O-ring 301, and with both O-rings being approximately centered about the opening in the balloon apex, as observed in FIG. 3c, screws 313, 314 are inserted into preformed holes in the external clamp platform 312 that also mate with preformed, threaded holes in the internal clamp platform 311. When the screws are securely tightened/anchored into the inner clamp platform 311, the internal and external clamps are tightened against one another and securely hold the aforementioned outer ring/anulus material of the balloon.

Note that in various embodiments the respective platforms 311, 312 of both the internal and external clamps are annular in shape having circular holes in their respective centers. When the platforms 311, 312 are mounted together these holes are vertically aligned which creates a fluid path/opening 315 from the inside of the balloon to the outside of the balloon. Although not specifically shown one or both of the platforms may have walls that the bolts extend through. The inner walls, when the platforms are tightly secured against one another, form an air-tight chamber between the platforms and the balloon opening.

Figure 3D:
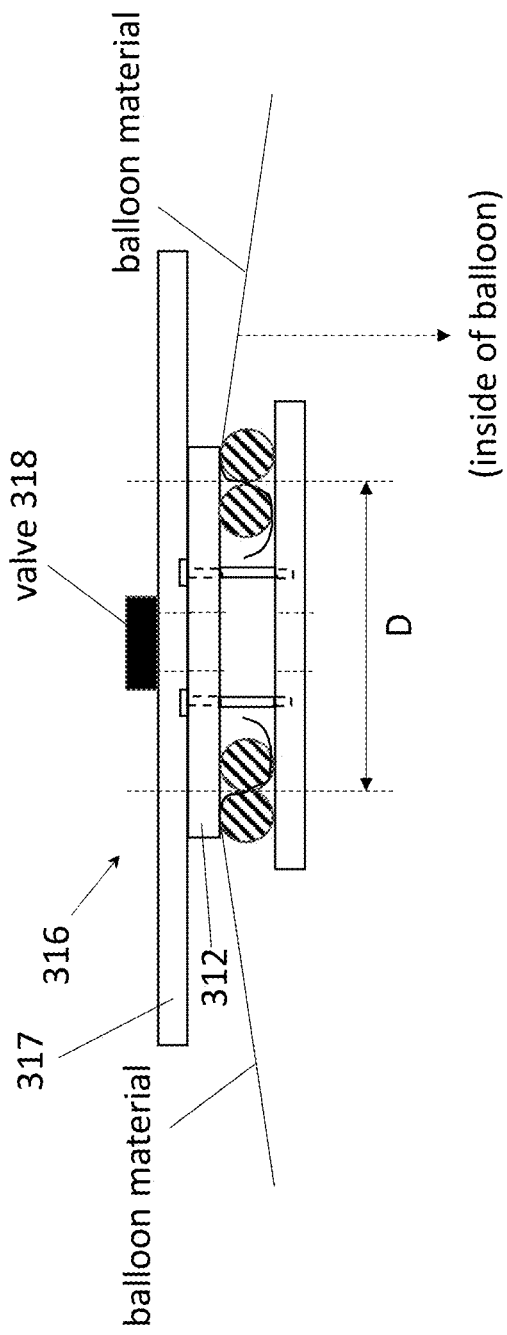

As observed in FIG. 3d, the venting apparatus 316 is then mounted to the platform 312 of the external clamp. Here, screws (not shown) are inserted into preformed holes (not shown) in the venting apparatus substrate/platform 317 that also mate with preformed, threaded holes (not shown) in the external clamp platform 312. When the screws are securely tightened/anchored into the platform 312 of the external clamp, the venting apparatus 316 is securely anchored to the overall assembly.

The respective platforms of both clamps and the venting apparatus substrate have openings so that a fluid pathway is formed between the external environment and the inside of the balloon. A valve 318 covers the opening in the venting apparatus substrate to "close" the fluid pathway. A gas-tight chamber is formed around the fluid pathway between the clamp platforms 311, 312 so that no gas can escape from the balloon when the valve is closed (the sidewalls of the air-tight seal can include the inner edge of the external, narrower O-ring and/or features/walls that extend from either or both clamp platforms to the other, facing clamp platform).

When the valve of the venting apparatus is in a closed position, as described at length above, the gas-tight chamber formed between the clamp platforms experience the internal conditions of the balloon. When the valve of the venting apparatus is open, however, gas inside the balloon is able to vent through the fluid pathway thereby reducing the lift of the balloon. Understanding the rate at which gas escapes from the balloon and setting the opening of the valve for a precise amount of time allows for the tight/precise release of a specific amount of gas from the balloon. As such, the rate of descent following the opening and closing of the aperture can be precisely controlled.

Although the above embodiments have described the wider clamp being inside the balloon and the narrower clamp being external to the balloon, in various embodiments this arrangement can be switched. That is, the narrower clamp can be inserted into the balloon and the wider clamp can be press-fit over the shape of the inner, narrower clamp on the outside of the balloon. Additionally, although the above embodiments have described the venting apparatus substrate 317 being a separate element that is mounted to the external clamp platform 312, in various embodiments these two features can be combined. That is, the narrower, external O-rings are formed on the bottom the apparatus substrate 317.

Figure 4B:
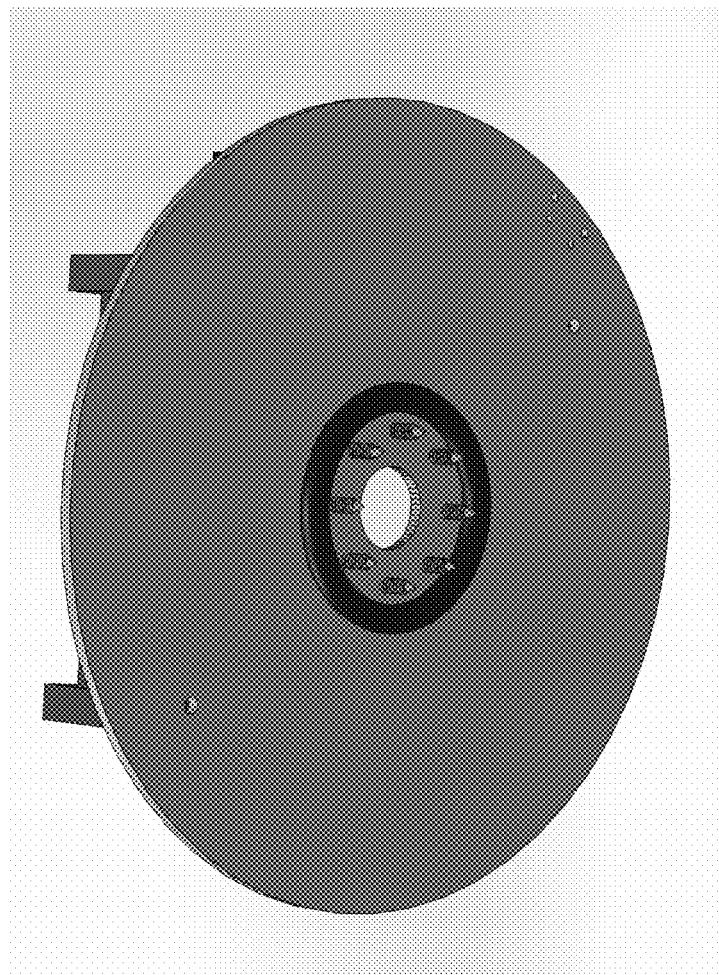
FIGS. 4a and 4b shows more detailed embodiments of the clamp of FIGS. 2a, 2b and 2c.
Figure 4A:
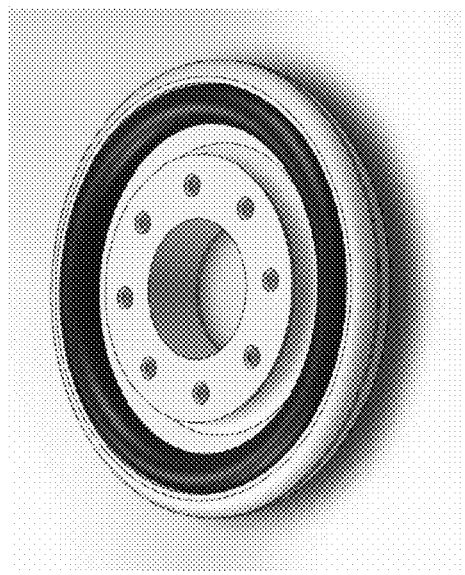

FIGS. 4a and 4b show a more detailed view of an embodiment of the wider, internal (FIG. 4a) and narrower, external (FIG. 4b). As observed in FIGS. 4a and 4b, both clamping platforms have inner sidewalls which form the gas-tight chamber when the platforms are screwed together. In essence, the wider, internal clamp platform can be viewed as a disc of some thickness having a groove formed in the face that mates to the narrower, external clamp. The groove is shaped to accept the O-ring of the narrower, external clamp.

FIG. 5 shows a more thorough depiction of (a cross section of) an embodiment of the apex venting system 500 including its valve mechanics and electronic circuitry. Note that the embodiment of FIG. 5 shows the narrower, external O-ring 512 being integrated with the bottom side of the venting system substrate 517. As observed in FIG. 5, the venting apparatus includes a stepper motor 520 that is mechanically coupled to a moveable valve 518 that covers the fluidic channel between the balloon opening and the substrate 517. Here, under nominal conditions when the balloon is rising or descending according to plan, the valve is in a closed position (tightly covers the fluidic channel) to preserve the amount the gas within the balloon and keep the balloon at its planned rate of ascent/descent.

However, if a change in the balloon's current state is desired (from ascending to descending, or, an increase to its current rate of descent), the stepper motor 520 is activated to open the valve 518. The valve is opened for a calculated amount of time that corresponds to the release of a specific amount of gas within the balloon. Once the valve has been opened for the calculated amount of time to release the desired amount of gas from the balloon, the stepper motor is again activated to close the valve. The balloon then descends according to the new, lesser amount of gas within the balloon.

As observed in FIG. 5, the venting apparatus includes a flex hinge 521 and a lever arm 522 that is mechanically coupled to each of the valve assembly 523, stepper motor 520 and flex hinge 521. Rotation of the stepper motor axle is translated into up/down movement of a push-rod 524 that is mechanically coupled to an underside of the lever arm 522 opposite the flex hinge 521. In a normal "relaxed" state, the push rod 524 is in a withdrawn state and the torque of the flex hinge 521 rotates level arm in a clockwise direction which drives the valve over/into the fluid channel to tightly cover the fluid channel.

When the fluidic channel is desired to be open, a signal is sent to the stepper motor 520 which causes the stepper motor to rotate in a first direction which, in turn, causes the push-rod 524 to extend upward. The upward extension of the push rod 524 overcomes the torque of the flex hinge 521 and causes the level arm 522 to rotate in a counter clockwise direction. The counter clockwise rotation of the level-arm lifts the valve thereby exposing the fluidic channel and allowing gas to escape from the balloon. The venting system remains in this state for the desired amount of time. Once the valve has been opened for the desired amount of time, another signal is sent to the stepper motor 520 to cause second rotation of the stepper motor 520 that results in the push-rod 524 being withdrawn so that the apparatus can return to its normal, relaxed state with the valve being closed over the aperture.

Alternate embodiments may choose to integrate the electro-mechanical properties and the valve into a single component, such as, a diaphragm composed of a material whose diameter, rigidity and/or other structural characteristic is responsive to, e.g., an electric and/or magnetic field such that, in one state, a first electric and/or magnetic field is applied (e.g., in terms of field intensity and/or field direction) to the diaphragm material thereby causing the diaphragm material to harden and/or expand to cover the vent opening (in which case the valve is closed), whereas, in a second state, a second different electric and/or magnetic field is applied (e.g., in terms of field intensity and/or field direction) to the diaphragm material thereby causing it to drape and/or contract and expose the vent opening (in which case the valve is open). Examples of potential materials include metallized mylar, conductive Ultra-high-molecular-weight polyethylene UHMWPE, conductive polyimide, flexible sheet magnetic material, diaphragm with embedded coils, piezoelectric membranes, graphene and shaped-memory-alloys. Embodiments for the valve can therefore be any kind of electro-mechanical valve apparatus.

Additionally, although embodiments above have stressed a mechanical mechanism to adhere the venting system to the balloon, in other approaches the mechanical venting apparatus may be adhered to the balloon with an adhesive glue that bears the load of the venting apparatus and the internal expansive/compressive forces of the balloon away from the balloon opening. For example, a (continuous or intermittent) "ring" of adhesive glue may be applied around the balloon opening (and/or at the bottom of the venting apparatus substrate/PC board) at a sufficiently larger radius than the radius of the balloon opening.

It is therefore pertinent to recognize that the teachings of the instant specification with regard to adhering a venting system to a balloon having an opening are not limited solely to clamps (or to adhesive glues), but, more generally, to adhesive elements (both a clamp and an adhesive glue can be considered an adhesive element). For the sake of descriptive ease, the instant application will continue to refer to a clamp as the adhesive element.

Figure 6:
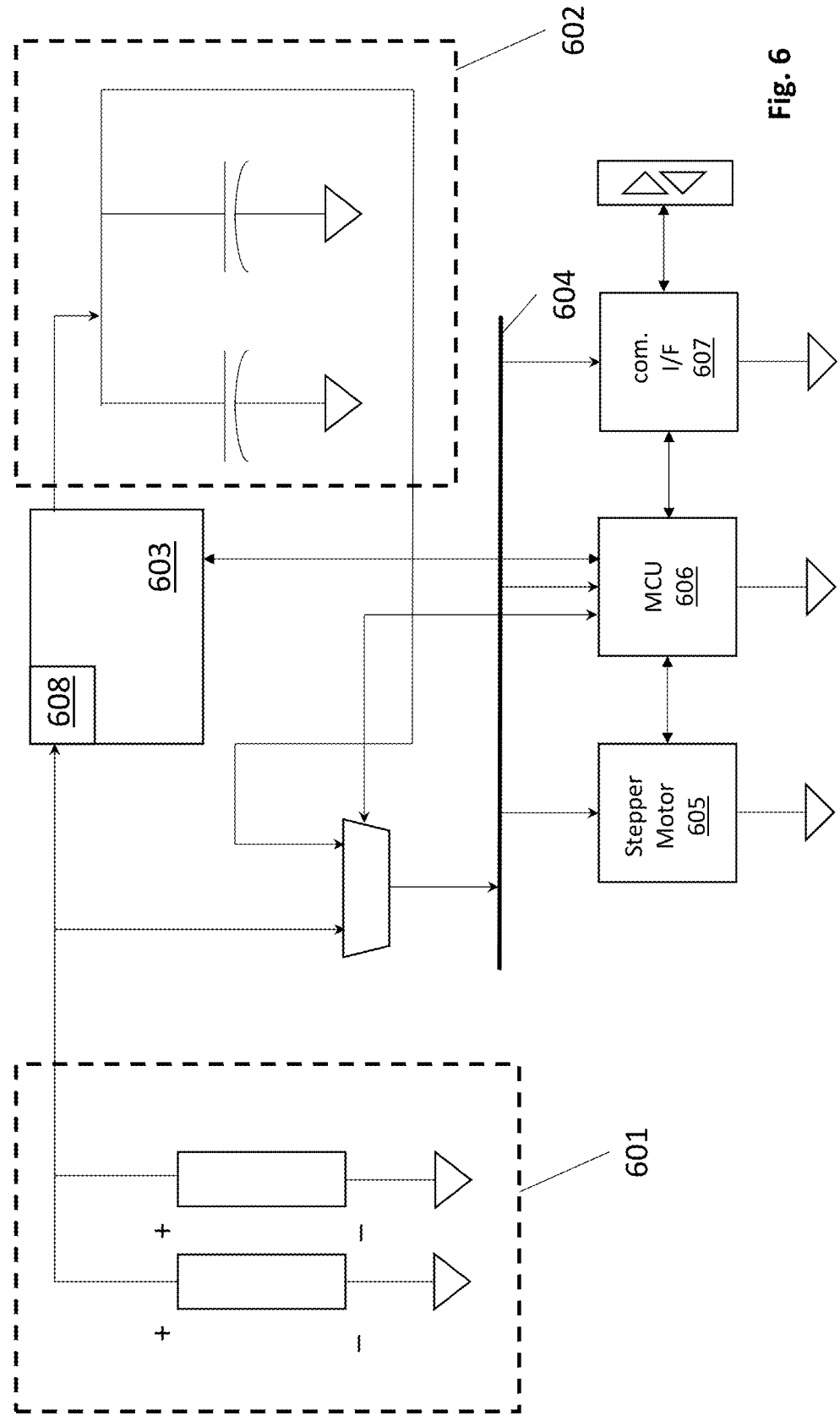
FIG. 6 shows an embodiment of an electrical design for a venting system.

FIG. 6 shows a high level view of the design for the venting system's electronic circuitry. In various embodiments, the components of the electronic circuitry are mounted to a surface (e.g., top surface) of the venting system substrate. As observed in FIG. 6, the venting system's electronic circuitry includes batteries 601, a capacitor bank 602, a trickle circuit 603 coupled between the batteries 601 and the capacitor bank 602. As described in more detail immediately below, the batteries 601 normally power the supply voltage rail 604 for a controller 605, the stepper motor 606 and a communication interface 607. However, under extreme low temperature conditions (e.g., approaching −70° C. or below), the capacitor bank 602 is relied upon partially or wholly to power the supply voltage rail 604.

In an embodiment, the batteries 601 are composed of lithium iron disulfide to provide long term, extended use over a large temperature range (other possible battery types are lithium thionyl chloride and lithium-titanate). At extreme low temperature conditions (e.g., approaching −70° or below), however, the batteries 601 cannot provide the instantaneous amount of current needed to drive the stepper motor 605 and other electronic components 606, 607. As such, the electrical system also includes a bank of capacitors 602 to provide the current needed by the stepper motor 606 (and other components 606, 607) when the batteries 601 are incapable of providing the current.

Here, the trickle circuit 603 charges the capacitors 602 from the batteries 601 until a maximum/desired voltage is observed on the capacitors 602. If action by the stepper motor 605 is desired and the temperature is sufficiently low to question the ability of the batteries 601 to drive the stepper motor, charge is drawn from the capacitors 602 (instead of the batteries 601) to provide the stepper motor's current.

The trickle circuit 603 then replenishes the capacitors 602 from the batteries 601. When the trickle circuit 603 observes the capacitors 602 have again reached their maximum/desired voltage, charge is again drawn from the capacitor bank 602 to provide the stepper motor 605 current. The process then continues until the stepper motor 605 has advanced the desired amount or the temperature has increased to a level at which the batteries 601 can provide the stepper motor current. In an embodiment, the capacitor bank 602 stores enough charge to supply at least one step of the stepper motor (and provide current for the controller 606 and communication interface 607). In this case, the trickle circuit 603 continues to replenish the batteries in between one or more stepper motor steps (which depletes the capacitor charge).

In various embodiments the trickle circuit 603 employs a Maximum Power Point Tracking (MPPT) circuit 608 to track the batteries 601. When current is pulled from the batteries 601, the battery output voltage sags (increasingly so at lower temperature) and trying to charge the capacitor bank 602 too quickly can collapse the battery voltage. When the battery voltage sags below a set voltage, the MPPT circuit 608 limits the trickle circuit's capacitor charge current to prevent the battery voltage from sagging any further. Effectively, the MPPT circuit 608 ensures the trickle circuit 603 charges the capacitors with as much power from the batteries 601 as the batteries 601 are able to give, which, in turn, causes the capacitor bank 602 to re-charge and the stepper motor to step as quickly as the on-board power supply permits. Here, program code executing on the controller 606 oversees the operation of the MPPT circuit 608, trickle charge circuit 603 and controls to what extent the supply rail 604 is powered by the capacitor bank 602 and/or batteries 601.

Here, the controller 606 is coupled to a temperature sensing device (e.g., thermocouple, thermo-meter) and/or receives ambient temperature information from its communication interface 607 so that the program code executing on the controller 606 can keep track of the ambient temperature and trigger reliance of the supply voltage from the batteries 601 and/or capacitors 602. In other embodiments the trickle charge 603 and MPPT circuits 608 operate with little or no influence/oversight by the controller 606 and instead determine when and to what extent the system should rely on the capacitor bank 602 for electrical power.

In various embodiments the batteries 601 are composed of lightweight, low temperature batteries such as any of lithium iron disulfide, lithium thionyl chloride and lithium-titanate. In same or other embodiments the capacitor bank is composed of lightweight, low temperature, fast discharge capacitors such as capacitors composed of any of Aluminum polymer, Aluminum electrolytic, Tantalum polymer, Tantalum electrolytic, Ceramic, ELDC ("supercapacitors"), Mica, Niobium oxide, thin-film, etc.

FIG. 7 depicts an embodiment of a complete system with balloon 702, apex venting system 702 and payload 703. As observed in FIG. 7, the payload 703 is attached to the bottom of the balloon and primarily includes various sensors 704, a communication system 705, an avionics system 706, a ballast system 707 and a parachute system 708. A second controller 709 is also integrated into the payload 703 to oversee/manage the operation of the payload systems 704-708 and the venting system 702.

In various embodiments the second controller 709 acts as a master controller for the overall balloon and communicates not only with the various electronic sub-systems 704-708 of the payload electronics but also with the controller of the apex venting system 702. The apex venting system controller receives communications and/or commands from the second (hereinafter, "master") controller 709 (e.g., temperature readings, commands to open the apex valve, commands to close the apex valve, commands to open the apex valve for a certain amount of time, etc.) and executes lower level routines in response to these communications (e.g., adjust battery charge rate, opens the apex vent valve, etc.).

Communication between the master controller and the venting system controller is accomplished through a communication link. As such, both the venting system 702 and payload electronics 703 include some kind of electronic interface to communicate with one another. The type of communication can be wireless (e.g., Bluetooth) or wired (e.g., Universal Serial Bus (USB). In the case of the later wires can be run along the side of the balloon between the venting system and the payload electronics to physically couple the two platforms.

The communication system 705 includes tele-communication circuitry (e.g., transmitter and receiver) for sending/receiving signals to/from satellite and/or ground based communication systems. In various embodiments the payload's various sensors 704 are to sense data for the external measurements (including those far away from the balloon, e.g., imagery taken with a camera on the balloon) the balloon has been sent to collect (e.g., atmospheric measurements such as temperature (with an on-board thermometer), barometric pressure (with an on-board barometer), air content/quality (with an on-board gas detector, particle counter, etc.), wind velocity (from on-board GPS velocity), etc., or other external measurements such as imagery (e.g., with on board camera and image processor, etc.), GPS radio occultation measurements (with on-board GPS), synthetic aperture radar (with on-board radio transceivers)) and balloon system data (e.g., temperature, ground speed (e.g., from multiple GPS position readings), altitude (with an on-board altimeter), GPS position (with an on-board GPS tracker), respective states of the various electronic sub-systems, etc.). Depending on current flight state/circumstance, one or more items of any of this data can be downloaded through a wireless down-link function of the communication system 705 for ultimate reception by, e.g., a ground based mission control station. Likewise, one or more commands (e.g., to change balloon altitude, to download certain data, to request balloon status, etc.) sent by the mission control station are received by the balloon through a wireless up-link function of the communication system 705.

The avionics system 706 includes flight related electronic circuitry for various "in-flight" functions such as altitude detection, global positioning system (GPS) implementation, ground speed determination, heading/bearing determination, etc.

The ballast system 707 includes a container filled with dense particulate matter (e.g., sand) and a dispenser coupled to a motor. When a determination is made to raise the balloon, increase the balloon's rate of ascent or decrease the balloon's rate of descent, the dispenser motor is engaged to open the container resulting in the release of particulate matter at a constant rate. The flow rate of the particulate matter combined with the length of time the container is opened determines the amount of total weight lost by the balloon, which, in turn, determines the rate at which the balloon will ascend in response to the release of the particulate matter (release of particulate matter can cause the balloon to transition from descending to ascending, or, cause the balloon to increase its rate of descent).

The parachute system 708 includes a parachute and release mechanics. In the event of free-fall (e.g., from balloon failure) or other loss of buoyancy situation the parachute can be released to prevent damage to the balloon system from a hard landing.

In various embodiments, the electronic circuitry of the payload 703 is powered by a second set of low temperature batteries (not shown), and, a second capacitor bank (not shown) provides backup support for the payload electronics at extreme low temperature environments. In various embodiments, the storage capacity of the second capacitor bank is designed to provide current for, e.g., worst case peak power draws of the communication, avionic, dispenser motor and parachute release mechanics.

The master controller 709 executes program code that adjusts the charge rate of the second capacitor bank in view of the ambient temperature and output of the second set of batteries. At extreme low temperatures when the batteries are deemed to be incapable of providing potential peak current(s) drawn by the payload electronics 704-709, the master controller 709 causes the payload electronics 704-709 to be sourced by the capacitor bank in view of the state of the payload electronics 704-709.

For example, if the communication system 705 is to execute an up-link or down-link of information resulting in high current draw by the communication system 705, the controller will source the payload electronics or at least the communication system 705 by the payload capacitor bank. Thus, in various embodiments, the power delivery system between the payload batteries and the payload capacitor bank includes a network controlled by the master controller 709 to source certain specific sub-systems that require high current draw from the capacitors if the batteries are incapable of providing the same. The granularity of the network can vary from embodiment (e.g., each sub-system can be separately powered by the batteries, or, only some or one of the sub-systems can be separately powered by the batteries). In still yet other embodiments no such network or ability to combine battery and capacitor bank power exists and the payload electronics are sourced either by just the payload batteries or just the payload capacitor bank.

In other or combined embodiments, at low temperatures, the master controller is able to place certain less critical electrical circuitry/sub-systems into a low power, reduced-function state to minimize the worst case current draw from the payload capacitor bank at low temperatures. In further embodiments, the master controller's program code comprehends a priority hierarchy of the different electronic circuits/sub-systems and, e.g., gradually places lowest priority circuits/systems into a low power, reduced function state as the ambient temperature drops and/or the power output of the payload batteries declines (as temperature continues to drop, higher and higher prioritized systems in the hierarchy are placed into a low power, reduced function state).

As alluded to above, in various embodiments, a ground based "mission control" station monitors balloon behavior, status and/or performance and sends commands to the balloon to perform certain measurements, download/upload certain information, change its state from ascend to descend or vice versa and/or alter its rate of ascent or descent.

Here, the ground based mission control takes advantage of higher performance computing systems to oversee and command the balloon's overall experiment(s) and flight. By contrast, the balloon's controller(s) execute more simplistic, lower level, power efficient functions. For example, the ground based mission control system oversees and commands the balloon's overall flight pattern and communicates simple commands to the balloon to effect the flight pattern (e.g., "change rate of ascent to [X]", "change rate of descent to [Y]").

The controller(s) on the balloon execute the applicable mathematical relationships to convert the commands into the appropriate balloon actions (e.g., determining amount of time to open apex valve or dispenser). By performing the more complex overall experiment control and flight control on the ground and limiting the balloon's calculations to the basic applicable physics and their corresponding limited actions, balloon battery/capacitor power is conserved.

As described at the onset of this description, the apex venting system allows an elastic balloon to execute many more soundings during a single flight than would be otherwise possible if the apex venting system did not exist.

FIG. 8 shows an exemplary depiction of the type of flight profile that is achievable with an elastic balloon having apex venting capability. As observed in FIG. 8, the flight profile includes a large number of ascend-to-descend transitions and descend-to-ascend transitions. As discussed above, in the case of a bottom venting elastic balloon, after approximately 48 hours of flight, the balloon's elasticity degrades to the point where gas cannot be vented from the balloon below a fairly high altitude (typically 15-20 km) resulting in loss of ability to induce or control balloon descent at altitudes beneath the altitude.

Without the ability to freely induce or control balloon descent beneath a higher altitude after 48 hours of flight, repeated soundings over a number of "cycles" between ascent/descent at any altitude—and particularly with upper bounds at lower altitudes—is not possible after 48 hours of balloon flight. Said another way, repeated cycles between ascent and descent at any desired altitude range are only possible within flight times of less than 48 hours.

By contrast, as observed in FIG. 8, with the apex vent functionality, balloon flight time does not depend on balloon elasticity. As a consequence, transition points from ascend to descend and descend to ascend are easily adjustable over a wide altitude range over an extended flight time beyond 48 hours, including, setting upper altitude bounds on sounding cycles at lower altitudes (such as altitudes 801 and 802) beyond 48 hours. The Applicant's apex venting elastic balloons can set upper sounding bounds (ascending to descending transitions) at altitudes well beneath 15 km including upper sounding bounds at or beneath 10 km such as 2 km or even sea level (0 km) after not only 48 hours of flight but also 96 hours of flight. As such, after 48 hours of flight or after 96 hours of flight, ascending to descending transitions can be set for any altitude beneath 15 km or even 10 km down to altitudes as low as 2 km or even sea level.

As a consequence, the number of soundings at desired (especially lower) altitude levels/ranges can be greatly increased over a much longer total flight time. Therefore, more meaningful experimentation/measurements can be undertaken (e.g., GPS position vs. time, air temperature, humidity, atmospheric pressure) for longer flight times with an apex venting elastic balloon that with a bottom venting elastic balloon. Significantly larger amounts of meaningful data can therefore be collected per balloon flight.

For example, if the balloon is sounded repeatedly for 60, 72, 84, 96 or more hours between two (e.g., lower) altitude levels, highly "dense" measurement data can be taken between these altitude levels over an extended time period at lower cost as compared to a bottom venting balloon (e.g., in the case of bottom venting balloon's, more than one balloon would need to be released to capture the same amount of data over the same time frame as a single apex venting balloon).

As highlighted above, with an apex venting elastic balloon, descent can be induced at much lower altitudes over longer periods of time than bottom venting balloons. As discussed above, in the case of bottom venting elastic balloons, degradation of balloon elasticity corresponds to higher and higher altitudes at which descent can be induced. By contrast, with apex venting, the ability to induce descent is not a function of altitude and therefore can be induced at any altitude including, e.g., after tens of hours of flight, much lower altitudes than the altitude where a bottom vented balloon's descent can be induced.

The ability to induce descent at lower altitudes translates into more densely collected data in terms of time and altitude with an apex vented balloon than with a bottom vented balloon. For example, if altitudes of interest are in a range from 5 km to 10 km, and after 20 hours of flight descent can be induced with a bottom vented balloon only at altitudes of 20 km or higher, after 20 hours of flight a bottom vented balloon can only fly repeated soundings in a 5-20-5-20 km pattern. By contrast, an apex vented elastic balloon can be tightly controlled to fly repeated soundings precisely in the altitudes of interest: 5-10-5-10 km. The former (5-20-5-20) includes substantial time and air space where measured data is of little value (the balloon is above 10 km). By contrast, with the later (5-10-5-10), the balloon is always collecting meaningful data. Because more meaningful data can be collected with an apex vented elastic balloon than a bottom venting elastic balloon per flight, apex venting elastic balloons are believed to be a substantial improvement in terms of cost per collected data set than bottom vented balloons.

The ability to induce descent at lower altitudes additionally provides for enlarged or extended sounding amplitudes over long periods of time. That is, the balloon is able to achieve repeated soundings where the altitude difference between the descent-to-ascent transition and the ascent-to-descent transition (and/or vice-versa) for one or more soundings is 10 km or more. Thus, again, highly dense/meaningful data can be collected over very precise altitude ranges over extended periods of time.

Dense measurement collection per balloon can also be readily extended/replicated to multiple, concurrently in-flight balloons so as to concurrently collect dense altitude profile measurement samples across large geographic areas. Here, again, the use of elastic balloon materials provides for reduced per balloon costs, which, in turn, allows for the manufacture and concurrent flight of multiple/many balloons. With many balloons concurrently in-flight, highly dense vertical and geographic data can be captured so as to, e.g., better model or understand weather patterns over a range of altitudes across a large geographic area.

Figure 9A:
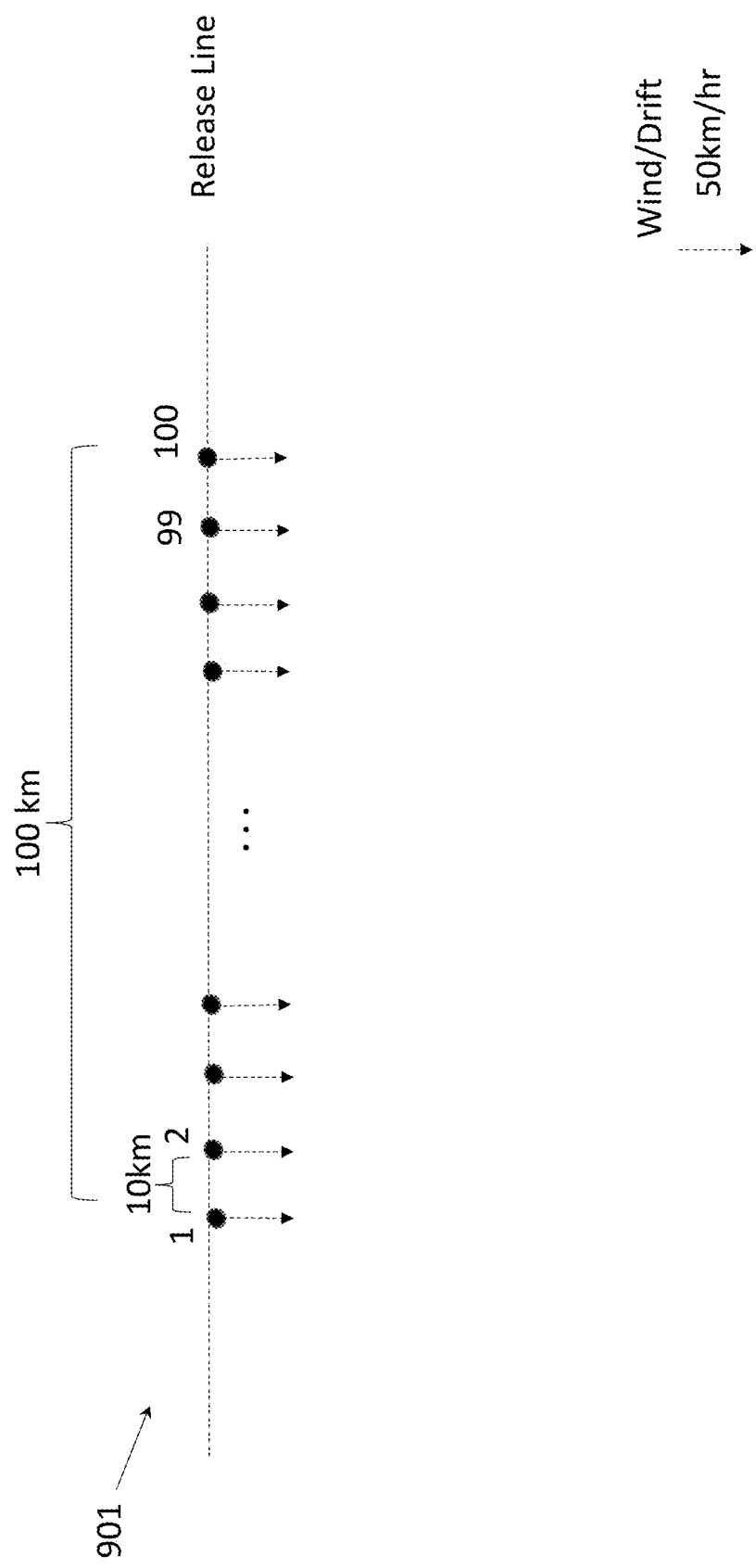
Figure 9B:
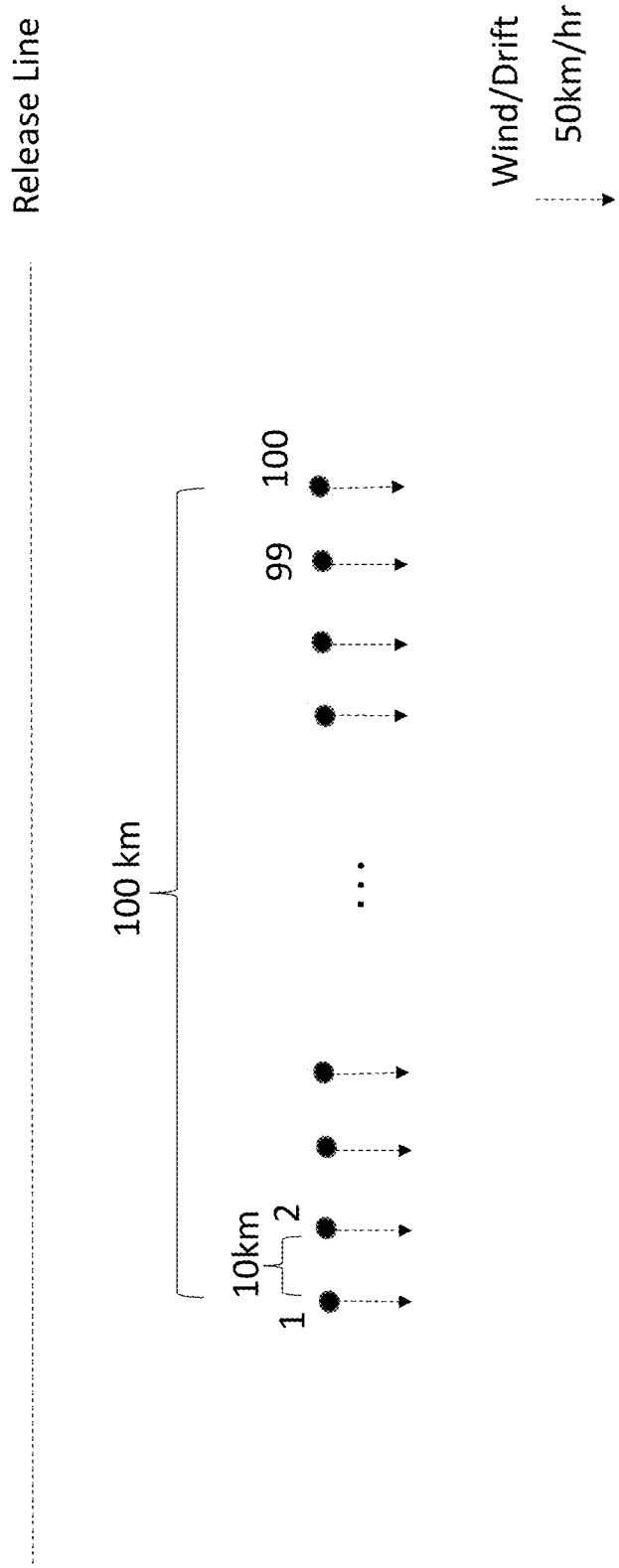

FIGS. 9a-9c demonstrate a top down view of a group of balloons 901 that are currently in-flight. Here, according to one approach, balloons are concurrently released from the ground (e.g., all balloons are released within minutes of one another but could be within hours or even days of one another), where, the release points for the balloons are strategically separated with distances between balloons being above some minimal spacing (so as to cover a wider geographic area) but within some maximum spacing (so as to increase the density of measurements over the geographic surface area).

Over time the balloons will drift with the winds they are subjected to. FIGS. 9a through 9c depict a simplistic example in which all balloons are subjected to the same winds at all times causing them to drift in unison (thereby preserving their release point organization). The collective drifting of the balloons effectively causes the surface area over which measurements are taken to "scan" a volume of atmosphere above the earth's surface.

According to the approach of FIGS. 9a through 9c, initially, as shown in FIG. 9a, a "line" of 100 balloons 901 spaced 10 km apart is released. Over time, as observed in FIG. 9b, the balloons drift with the wind at a rate, e.g., of 50 km/hr. After the balloons have been adrift for 1 hour, as observed in FIG. 9c, they will have traveled a distance of 50 km (1 hr×50 km/hr=50 km) and a second "line" of 100 balloons 902 spaced 10 km apart is then released from the initial release points as the first line of balloons.

If the wind drift stays constant at 50 km/hr, the balloons will effectively measure over a grid having spacings of 10 km (the balloon spacing) perpendicular to the wind direction and 50 km (the balloon drift distance in between balloon releases) along the wind direction. This grid then "scans" over the surface of the earth as the balloons extend their flight in time. For example, if each of the balloon lines are in flight for 60 hours, the aforementioned grid will scan an area of 1000 km×3000 km (=3×10$^6$ km$^2$) if each of the balloon lines are in flight for 100 hours, the aforementioned grid will scan an area of 1000 km×5000 km (=5×10$^6$ km$^2$)

over the earth's surface. If third, fourth, etc. lines of balloons are released every hour, the density of the data collected within the grid. That is, more readings are made over more time over the scanned surface area.

Moreover, as discussed at length above, during flight, each of the balloons are continually changing their altitude levels to effectively capture dense vertical/altitude profile data over the large surface area (e.g., their altitude levels repeatedly rise from 10 km to 20 km and then fall from 20 km to 10 km). The result is cost effective yet extremely dense altitude profiling over large geographic areas over a concise, in-flight time frame.

Such cost effective yet dense measurement taking over such large geographic areas in such concise time frames is expected to greatly enhance scientific understanding of weather and/or atmospheric conditions, which, in turn, can greatly enhance weather and/or atmospheric models (e.g., for hurricane/storm/tornado prediction and/or tracking; wind-turbulence prediction and/or tracking for commercial aviation, etc.). In general, the accuracy of such models depends upon the density at which the measurements they are based on can be taken over time, geographic area and altitude. Release of large numbers of inexpensive balloons for flight/drift over large regions of interest with dense altitude profiling over concise time frames should be able to generate the amount of data needed to achieve an improved level of accuracy above existing models.

Notably, in order to increase the measurement taking effectiveness and/or cost-effectiveness of the measurements, generally, atmospheric conditions change less above 20 km than between 10 km-20 km. As such, the planned frequency at which a balloon repeatedly rises and falls may be much greater when the balloon is between 10 km-20 km than when the balloon is above 20 km. As such, for instance, a balloon's flight plan may schedule more soundings between 10 km-20 km than between 20 km-30 km or between 10 km and 30 km (as could be the case with a bottom venting balloon). Again, the ability to tightly control the sounding min and max altitudes can result in lower cost per collected data point as well as temporally finer data points. Apart from cost savings, the later can be more valuable because, e.g., it leads to more precise modeling. As a point of note, valuable data for storms tends to be below 10 km so the ability to tightly control a max altitude of 10 km so that multiple soundings can be performed that do not rise above 10 km (e.g., 5-10-5-10, etc.) should at least help improve storm modeling and/or reduce the costs needed to improve storm models.

Of course, in many scenarios, various ones of the balloons will be subjected to different winds thereby continuously distorting the measurement grid arrangement that the balloons were originally released according to. In various embodiments, the data collected by a first group of concurrently released balloons is used to establish a second measurement grid arrangement for a second group of concurrently released balloons so as to, e.g., more effectively cover the geographic surface area of interest that both balloon groups approximately scan/cover. For example, after a first group of balloons are released, high wind regions (and direction(s) of such winds) may be identified by the first group which, in turn, changes the release grid arrangement so that more balloons will fly into these areas to enhance temporal data measurement through these areas (e.g., if strong south-easterly winds are expected for a group of balloon released in a certain area, a larger percentage of balloons are released along an area that extends along a north-westerly direction from the area). Additional recursions (balloon groups) can be subsequently released with each subsequent group's release arrangement being better optimized for existing conditions based on the total knowledge gained from all previously released groups.

Although embodiments above have emphasized that the venting system is located at the apex of the balloon, other embodiments may mount or locate the venting system in a location other than the absolute apex of the balloon. For example, some balloons may have a depression in the top, center of the balloon and the venting system may nevertheless be placed there. Other embodiments may also choose to place a venting apparatus in a location other than the top, center of the balloon or the apex of the balloon. For example, a cigar shaped balloon may include first and second venting apparatus that are located towards the ends of the cigar rather than at the top, center apex of the cigar. In short, various embodiments for various reasons may choose to place the venting apparatus away from the top, center of the balloon and/or away from the apex of the balloon. Generally, the venting system can be placed anywhere "above" or at least "next to" gas within the balloon so that the gas will naturally escape from the balloon when the valve is open without significant dependence on the balloon's elasticity (e.g., closer to a ceiling than a bottom of the balloon, somewhere in a top half of the balloon, etc.).

Although embodiments above have emphasized a balloon system that does not include a source of "lighter-than-air" gas (e.g., within the payload or otherwise) so that gas is added to the balloon only prior to take-off, other embodiments may choose to include a gas source, e.g., to extend flight lifetimes beyond those achievable with a balloon system that does not have a gas source.

Importantly, the approach of concurrently releasing multiple (e.g., ten or more) person-less balloons over a large geographic distances and/or areas and then taking measurements as the balloons drift (e.g., for at least 1000 km or even 3000 km) and repeatedly ascend and descend during their drift according to a designed altitude flight plan, as discussed at length above with respect to FIGS. 8 and 9a,b,c, can be extended to balloons of any type and is not limited to elastic balloons and/or elastic balloons with apex venting capability. That is, as just one example, multiple person-less super pressure balloons (e.g., each with an on board lighter than air gas source) can be released en masse and take measurements as they drift according to a designed altitude flight plan composed of soundings between specific altitude levels realized with repeated ascending-to-descending and descending-to-ascending transitions at certain altitudes.

Nevertheless, with data collection density being proportional to the number of balloons that are released, the cost of the overall measurement taking process is largely dependent on the cost of the balloon and its associated equipment/payload. As such, highly dense data measurements collected over large geographic areas becomes more feasible, from a cost perspective, as the balloons and their payloads become less expensive. Notably, the cost of a balloon and its payload generally declines with decreasing balloon and payload size and weight. The payload of a balloon is the total sum weight that is transported by the balloon during flight other than the weight of the balloon material itself (e.g., the combined weight of the venting apparatus, measuring equipment, electronics (power, communications, etc.) ballast, gas pumping apparatus (if any) all contribute to the balloon's payload).

Therefore, at least with the elastic apex venting balloon approach described at length above, the Applicants have realized an affordable high data collection density technology. More specifically, the Applicant's balloon systems generally can be manufactured with 12 pounds of payload or less, or even 6 pounds of payload or less. As a consequence, concurrent en masse release of balloons (e.g., at least ten balloons such as tens of balloons, hundreds of balloons, etc.) in an arrangement patterned over a large geographic distance and/or area is realizable with the Applicant's technology. As described at length above, the en masse release of balloons can be followed by repeated ascending-to-descending and descending-to-ascending transitions according to a defined altitude flight plan (including altitude differences between ascending-to-descending transitions and descending-to-ascending transitions (or vice-versa) of 10 km or greater) as they drift over 48 hours or more (or even 96 hours or more), e.g., so that they drift at least 1000 km (or at least 3000 km), to effect many soundings at specific altitudes and resulting high density data collection over these altitudes.

Embodiments of the invention may include various processes as set forth above. The processes may be embodied in program code or machine-executable instructions. The instructions can be used to cause a general-purpose or special-purpose processor or controller to perform certain processes. Alternatively, these processes may be performed by specific/custom hardware components that contain hard interconnected logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the program code or machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing program code or machine-executable instructions. For example, aspects of the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In particular, any/all of the balloon activities described, whether within a single balloon assembly or amongst a group of balloons in collective flight, can be partially or wholly embodied as program code (e.g., firmware) that resides on the balloons and/or various forms of hardware implementation (custom hardwired logic circuitry (e.g., application specific integrated circuit (ASIC) logic circuitry), programmable logic circuitry (e.g., field programmable gate array (FPGA) logic circuitry), logic circuitry that executes program code (e.g., a processor or controller) or any combination. Various, e.g., oversight and/or control functions applied to one or more balloons can also be implemented as any combination of program code executed on, e.g., a land based computer (e.g., as application software) and/or any of the hardware possibilities described just above (e.g., in a land based computer or "black box").

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
an elastic balloon venting system comprising:
a clamp, an outer platform and an inner platform, the outer platform shaped to reside outside an opening in the elastic balloon on an outer surface of the elastic balloon, the inner platform shaped to reside outside the opening in the elastic balloon on an inner surface of the elastic balloon, wherein the inner and outer platforms are respectively shaped as O-rings, where, a first of the O-rings fits inside a second of the O-rings, the clamp to press the outer platform against the inner platform within the opening in the elastic balloon;
a fluidic channel that is coupled to the opening in the elastic balloon when the clamp is pressing the outer platform against the inner platform; and,
an electro-mechanical valve apparatus, the electro-mechanical valve apparatus to drive a valve to open the fluidic channel so that gas within the elastic balloon escapes the elastic balloon when the valve is open and to close the fluidic channel so that gas remains within the elastic balloon when the valve is closed.

2. The apparatus of claim 1 further comprising the elastic balloon.

3. The apparatus of claim 2 wherein the opening is located at a location of the elastic balloon where the gas will escape the balloon when the valve is open in the absence of elastic compression of the elastic balloon.

4. The apparatus of claim 3 wherein the opening is located at an apex of the elastic balloon.

5. The apparatus of claim 1 wherein the elastic balloon venting apparatus further comprises electronic circuitry to send control signals to the electro-mechanical valve apparatus.

6. The apparatus of claim 5 wherein the electronic circuitry further comprises at least one battery and at least one capacitor, the at least one capacitor to supply the electro-mechanical valve apparatus with electrical power when the battery is not capable of providing the electro-mechanical valve apparatus with sufficient electrical power.

7. An apparatus, comprising:
a) a balloon having an opening, the opening not being located at a bottom of the balloon;
b) a venting system, the venting system comprising:
i) an inner platform, an outer platform and a clamp, the inner platform to be positioned on an inner surface of the balloon and shaped to reside outside the opening, the outer platform to be positioned on an outer surface of the balloon and shaped to reside outside the opening, wherein the inner and outer platforms are shaped as respective O-rings, where, a first of the O-rings fits inside a second of the O-rings, the clamp to be aligned with the opening, the clamp to press the inner platform against the outer platform within the opening;
ii) a fluidic channel that is coupled to the opening when the clamp is pressing the inner platform against the outer platform the opening; and,
iii) an electro-mechanical valve apparatus, the electro-mechanical valve apparatus to open the fluidic channel so that gas within the balloon escapes the balloon when a valve of the electro-mechanical valve apparatus is open and to close the fluidic channel so that gas remains within the balloon when the valve is closed.

8. The apparatus of claim 7 wherein the opening is located at a balloon location where the gas will escape the balloon when the valve is open in the absence of elastic compression of the balloon.

9. The apparatus of claim 8 wherein the opening is located at an apex of the balloon.

10. The apparatus of claim 7 wherein the balloon venting apparatus further comprises electronic circuitry to send control signals to the electro-mechanical valve apparatus.

11. The apparatus of claim 10 wherein the electronic circuitry further comprises at least one battery and at least one capacitor, the at least one capacitor to supply the electro-mechanical device with electrical power when the battery is not capable of providing the electro-mechanical device with sufficient electrical power.

12. An apparatus, comprising:
a clamp to bear a mechanical load away from an opening in a balloon, the clamp comprising a first component and a second component, the first component to be inserted into the balloon and the second component to remain external from the balloon, the first and second components to be mated together within the opening in the balloon with material of the balloon being sandwiched in-between, wherein, a first feature of one of the first and second components fits inside a second feature of the other of the first and second components, wherein the first feature is a first O-ring and the second feature is a second O-ring with wider radius than the first O-ring.

13. The apparatus of claim 12 wherein the first and second components each comprise a respective opening, the respective openings to form a fluid channel that extends from the opening in the balloon when the first and second components are mated together.

* * * * *